United States Patent
Lee et al.

(10) Patent No.: US 8,504,669 B2
(45) Date of Patent: Aug. 6, 2013

(54) SYSTEM AND METHOD FOR OSGI-BASED SERVICE DELIVERY FRAMEWORK

(75) Inventors: Jonathan Lee, Taoyuan County (TW); Ping-Feng Wang, Miaoli County (TW); Shin-Jie Lee, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 470 days.

(21) Appl. No.: 12/788,272

(22) Filed: May 26, 2010

(65) Prior Publication Data

US 2011/0145382 A1   Jun. 16, 2011

(30) Foreign Application Priority Data

Dec. 16, 2009   (TW) .............................. 98143248 A

(51) Int. Cl.
*G06F 15/173*   (2006.01)
(52) U.S. Cl.
USPC ............................ 709/223; 709/226; 717/174
(58) Field of Classification Search
USPC ......... 709/217, 220, 223, 203, 226; 719/311; 726/14; 713/171; 717/174
See application file for complete search history.

(56) References Cited

U.S. PATENT DOCUMENTS

| | | | |
|---|---|---|---|
| 2005/0005002 A1* | 1/2005 | Bodin et al. | 709/223 |
| 2005/0015462 A1* | 1/2005 | Lee et al. | 709/217 |
| 2005/0144262 A1* | 6/2005 | Kang et al. | 709/220 |
| 2007/0083925 A1* | 4/2007 | Hargrave et al. | 726/14 |
| 2007/0192462 A1* | 8/2007 | Bae et al. | 709/223 |
| 2008/0229324 A1* | 9/2008 | Huang et al. | 719/311 |
| 2009/0030979 A1* | 1/2009 | Hayes, Jr. | 709/203 |
| 2010/0037057 A1* | 2/2010 | Shim et al. | 713/171 |

FOREIGN PATENT DOCUMENTS

| | | |
|---|---|---|
| TW | I235939 | 7/2005 |
| TW | I315952 | 10/2009 |

OTHER PUBLICATIONS

"Office Action of Taiwan Counterpart Application", issued on Oct. 30, 2012, p. 1-p. 6, in which the listed references were cited.

* cited by examiner

*Primary Examiner* — Jungwon Chang
(74) *Attorney, Agent, or Firm* — Jianq Chyun IP Office

(57) ABSTRACT

A system and a method for OBSi-based (open service gateway initiative) service delivery framework are provided. The system is adaptable to a first host executing an OSGi bundle. A mobile service module of the first host is inherited through the OSGi bundle. A second host is assigned when the OSGi bundle calls a mobilize function inherited from the mobile service module. A bytecode and an instance of the OSGi bundle are obtained through a first delivery context processing module of the first host. The bytecode and instance of the OSGi bundle are transmitted from the first host to the second host through the first delivery context processing module and a second delivery context processing module of the second host. The bytecode and instance of the OSGi bundle are installed and the OSGi bundle is executed through the second delivery context processing module.

7 Claims, 6 Drawing Sheets

```
private File getBundleFile( Bundle bundle, String... servicePkgName ) { string fileName =getBundleFilename( bundle);
    string path=null;

JarOutputStream jos=new JarOutputStream(new FileOutputStream(fileName));
    Enumeration e = bundle.findEntries("/","*",ture);

while ( e.hasMoreElements() ){
        path=((URL)e.nextElement()).getPath() ;
        DataInputStream dis:
        if (path.contains("manifest")) {
            dis = modifyManifest(servicePkgName) ;
        } else {
            dis = new DataInputStream(bundle.getEntry(path).openStream()) ;
        }
        JarEntry je=new JarEntry (path) ;
        jos.putNextEntry(je) ;
        int data ;
        while ( (data=dis.read()) != -1 ) jos.write(data) ;
    }
    jos.close() ;

return new File(fileName) ;
}
```

SYSTEM AND METHOD FOR OSGI-BASED SERVICE DELIVERY FRAMEWORK

CROSS-REFERENCE TO RELATED APPLICATION

This application claims the priority benefit of Taiwan application serial no. 98143248, filed on Dec. 16, 2009. The entirety of the above-mentioned patent application is hereby incorporated by reference herein and made a part of specification.

BACKGROUND OF THE INVENTION

1. Field of the Invention

The present invention generally relates to a system and method for service delivery framework, and more particularly, to a system and method for open service gateway initiative (OSGi).

2. Description of Related Art

The open service gateway initiative (OSGi) specification is developed by the OSGi Alliance, and which is dedicated to specifying an integrated information service platform. A remote software service provider can provide application programs and add-on services to its users through such a service platform, wherein these application programs and add-on services can be dynamically downloaded through the Internet and automatically installed into end-user devices according to user requirements.

In recent years, different OSGi based service platforms for automotive telematics have been developed. In particular, the OSGi Vehicle Expert Group (VEG) proposes the support of web services as a major requirement to OSGi based service platforms for automotive telematics. However, the support of web services in automotive telematics is confronted with two major issues. The first issue is the optimization for low bandwidth. Because the transmission of web services to telematics devices is usually restricted by wireless communication bandwidths and connection expenses, a service provider desires the data transmission quantity to be optimized. The second issue is about unstable links. A web service relies on a constant network connection to transmit service calls, call waiting, and service data. However, because the telematics wireless network environment of the service provider has posed a great challenge to the stable network performance.

SUMMARY OF THE INVENTION

Accordingly, the present invention is directed to service delivery system and method for an open service gateway initiative (OSGi), wherein an OSGi bundle is allowed to actively and continuously move on multiple hosts.

The present invention provides a service delivery method of an OSGi framework. The service delivery method is adaptable to a first host executing an OSGi bundle. The service delivery method includes following steps. A mobile service module and a first delivery context processing module are provided in the first host. The mobile service module is inherited through the OSGi bundle so that the self-developed OSGi bundle inherits the functions of the mobile service module. The data of a second host is assigned when the OSGi bundle calls a mobilize function inherited from the mobile service module. The bytecode and the instance of the OSGi bundle are obtained through the first delivery context processing module. A second delivery context processing module is provided in the second host. The bytecode and the instance of the OSGi bundle are transmitted from the first host to the second host through the first delivery context processing module and the second delivery context processing module. The bytecode and the instance of the OSGi bundle are installed and the OSGi bundle is executed through the second delivery context processing module.

According to an embodiment of the present invention, after the bytecode and the instance of the OSGi bundle are obtained, the service delivery method further includes modifying a manifest of the OSGi bundle according to a service of the second host required by the OSGi bundle through the first delivery context processing module.

According to an embodiment of the present invention, after the bytecode and the instance of the OSGi bundle are obtained, the service delivery method further includes packing or serializing the bytecode and the instance of the OSGi bundle through the first delivery context processing module.

According to an embodiment of the present invention, after the bytecode and the instance of the OSGi bundle are transmitted to the second host, the service delivery method further includes de-serializing the instance of the OSGi bundle and restoring the bytecode of the OSGi bundle through the second delivery context processing module.

According to an embodiment of the present invention, after the instance of the OSGi bundle is received, the service delivery method further includes de-serializing the instance of the OSGi bundle through the second delivery context processing module.

According to an embodiment of the present invention, after the bytecode and the instance of the OSGi bundle are de-serialized and installed, the service delivery method further includes starting the OSGi bundle through an onMobilized function of the OSGi bundle inherited from the mobile service module, so as to continue to execute a program or a service.

The present invention provides a service delivery system of an OSGi framework. This system includes a first host and a second host. The first host includes an OSGi bundle, a mobile service module, and a first delivery context processing module. The OSGi bundle is a user-defined program executing a service and inherited functions of the mobile service module. The mobile service module assigns the second host. The first delivery context processing module obtains the bytecode and the instance of the OSGi bundle, packs or serializes the bytecode and the instance of the OSGi bundle, and transmits the packed or serialized bytecode and instance of the OSGi bundle to the second host. The second host is coupled to the first host, and which receives the packed or serialized bytecode and instance of the OSGi bundle.

According to an embodiment of the present invention, the first delivery context processing module further serializes the instance of the OSGi bundle.

According to an embodiment of the present invention, the first delivery context processing module further modifies a manifest of the OSGi bundle, packs the bytecode of the OSGi bundle, and serializes the instance of the OSGi bundle according to a service to be provided by the second host.

According to an embodiment of the present invention, the second delivery context processing module further de-serializes the instance of the OSGi bundle and restores the bytecode of the OSGi bundle.

According to an embodiment of the present invention, the second delivery context processing module further uses the functions of the OSGi bundle inherited from the mobile service module.

According to an embodiment of the present invention, the service system further includes a server coupled to the first host, wherein the first host downloads the OSGi bundle from the server.

As described above, in the present invention, the bytecode and instance of an OSGi bundle are transmitted from a first host to a second host through a mobile service module and delivery context processing modules. Thereby, the instance and bytecode of the OSGi bundle generated during the execution of the OSGi bundle are allowed to move and execute a service on different hosts through network transmission.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 illustrates the pseudo code of a getBundleFile function.

DESCRIPTION OF THE EMBODIMENTS

Figure 1:
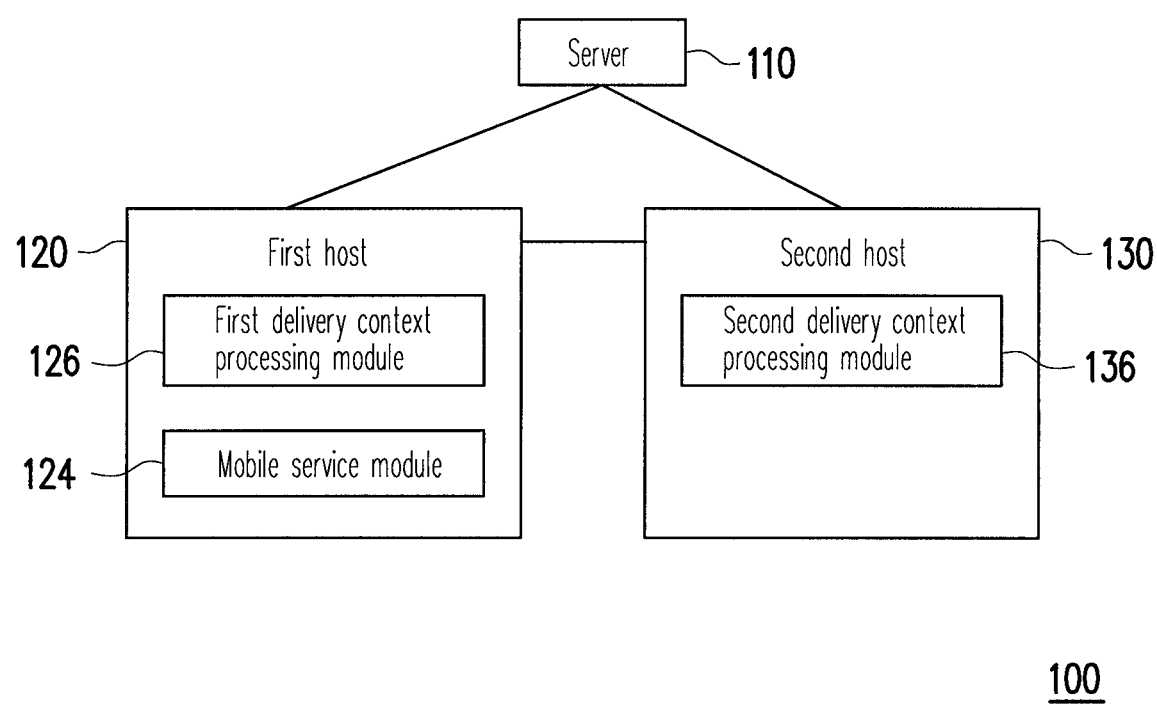
FIG. 1 is a block diagram of a service delivery system and method of an open service gateway initiative (OSGi) framework according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a service system of an open service gateway initiative (OSGi) framework according to an embodiment of the present invention. Referring to FIG. 1, the service system 100 includes a server 110, a first host 120, and a second host 130. The first host 120 is coupled to the server 110 to download an OSGi bundle from the server 110. The second host 130 is coupled to the server 110 and the first host 120 to receive the bytecode and the instance of the OSGi bundle from the first host 120, or the second host 130 receives another OSGi bundle from the server 110 and the instance of the OSGi bundle from the first host 120. In following embodiment, the peer to peer service passing between the first host 120 and the second host 130 will be described.

The first host 120 includes a mobile service module 124 and a first delivery context processing module 126. The mobile service module 124 is inherited by the OSGi bundle, and which assigns the second host 130. The first delivery context processing module 126 obtains the bytecode and the instance of the OSGi bundle and transmits the bytecode and the instance of the OSGi bundle to the second host 130. The second host 130 includes a second delivery context processing module 136 for receiving and installing the bytecode and the instance of the OSGi bundle and executing the OSGi bundle.

Figures 2A, 2B:
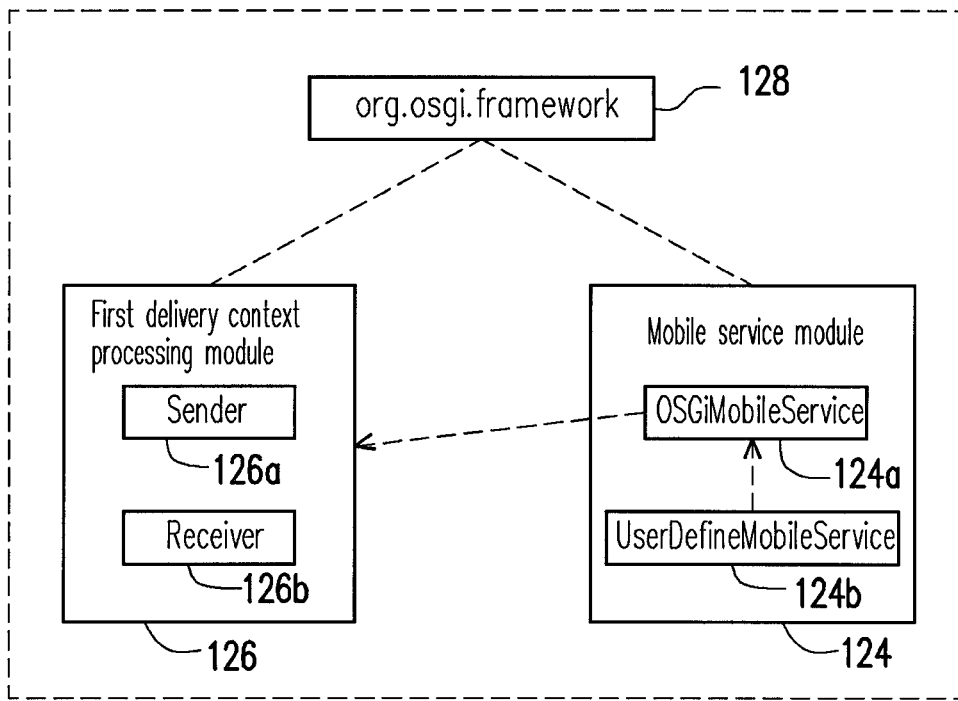
FIG. 2A is a diagram of a first host in FIG. 1.
FIG. 2B illustrates the pseudo code of an OSGiMobileService class in FIG. 2A.

FIG. 2A is a diagram of the first host in FIG. 1. Referring to FIG. 1 and FIG. 2A, in order to be executed on an OSGi platform, the mobile service module 124 and the first delivery context processing module 126 have to import at least one basic package in the OSGi application programming interface (API), wherein the basic package is referred to as an org.osgi.framework package 128.

Three different classes are provided in the present embodiment. The three classes include a mobile service class (referred to thereinafter as an OSGiMobileService class 124a), a mobile service sending class (referred to thereinafter as a sender class 126a), and a mobile service receiving class (referred to thereinafter as a receiver class 126b). The sender class 126a and the receiver class 126b belong to the first delivery context processing module 126, the OSGiMobileService class 124a belongs to the mobile service module 124, and the other portion is designed and developed according to the actual requirement of a user.

FIG. 2B illustrates the pseudo code of the OSGiMobileService class in FIG. 2A. Referring to FIG. 2B, the OSGiMobileService class 124a provides a function for processing mobility (referred to thereinafter as a mobilize function G1) and a function for searching and using services provided by a host after moving (referred to thereinafter as an onMobilized function G2). The mobilize function G1 calls a send function in the sender class 126a so as to transmit the bytecode and the instance of the OSGi bundle to the second host 130. In the present embodiment, the send function has the functions of receiving and transmitting a bytecode and an instance.

Namely, the mobilize function G1 assigns a receiver host to which the OSGi bundle is about to move as the second host 130, obtains the bytecode and instance of the OSGi bundle through the send function in the sender class 126a, serializes the bytecode and instance, and sends the serialized bytecode and instance to the second host 130 through a network, so as to mobilize the OSGi bundle.

In addition, the onMobilized function G2 is implemented as a subclass, and this function is automatically called after the OSGi bundle moves to the second host 130. A user can design the function of the subclass according to the services provided by the user and obtain the instance of the OSGi bundle through the receiver class 126b, so that the OSGi bundle can have the de-serialization behavior of the mobile service module.

Figure 3:
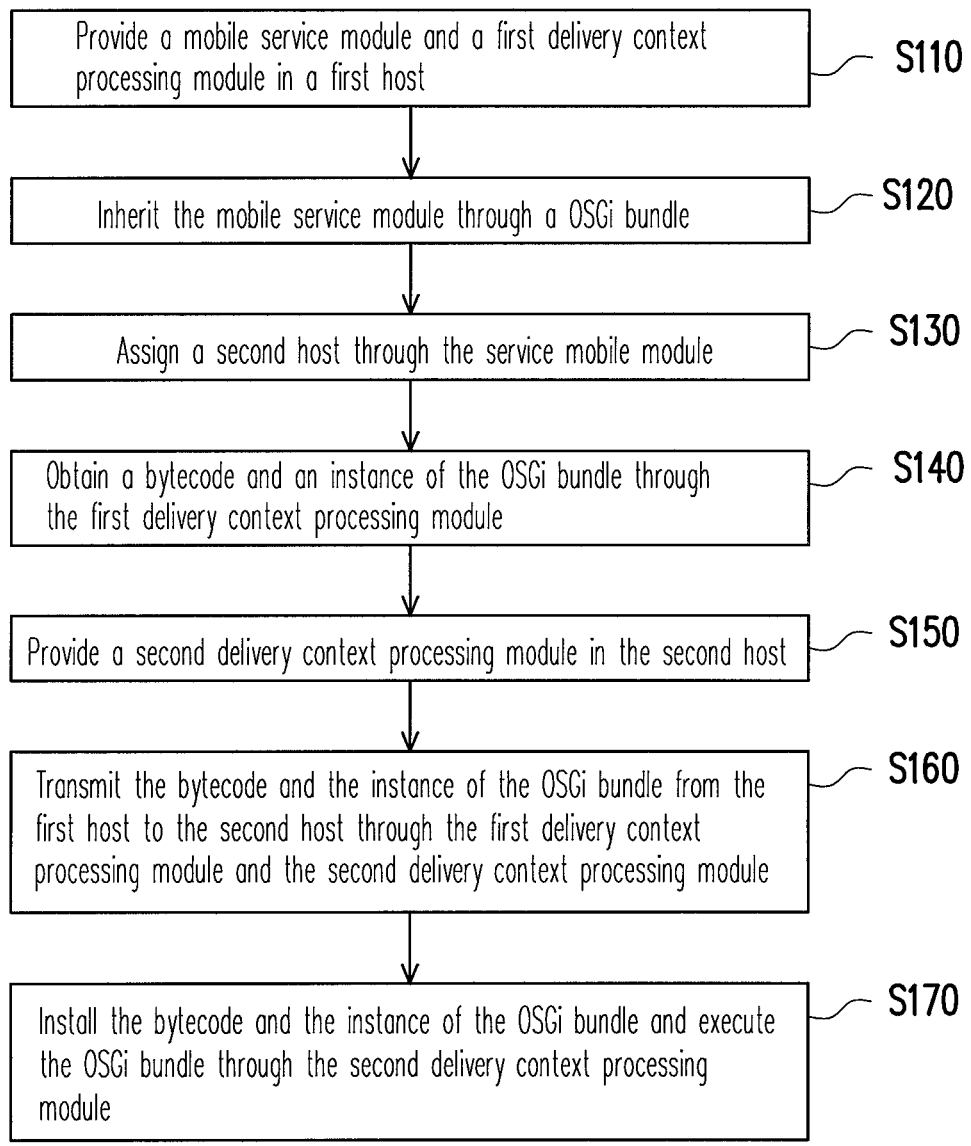
FIG. 3 is a flowchart of a service delivery method for OSGi-based framework according to an embodiment of the present invention.

FIG. 3 is a flowchart of a service delivery method for OSGi-based framework according to an embodiment of the present invention. Below, the service passing method of the OSGi framework in the present embodiment will be described with reference to the service system 100 illustrated in FIG. 1 and FIG. 2. Referring to FIG. 3, in step S110, the mobile service module 124 and the first delivery context processing module 126 are first provided in the first host 120. Then, in step S120, the mobile service module 124 is inherited through the OSGi bundle so that the self-developed OSGi bundle can have functions of the mobile service module 124. In step S130, a second host 130 is assigned when the self-developed OSGi bundle calls a mobilize function inherited from the mobile service module 124. Namely, the second host 130 is assigned through the mobilize function G1 in the OSGiMobileService class 124a.

Next, in step S140, the first host 120 obtains the bytecode and the instance of the OSGi bundle through the first delivery context processing module 126. Because the bytecode of the OSGi bundle cannot be directly obtained from the API provided by the OSGi framework, in the present embodiment, a structure of all directories and files in the OSGi bundle is obtained through a findEntries function in an OSGi service bundle interface. Through this technique, data of each directory or file in the OSGi bundle is read as a file class, and the data is then written into a JarEntry class. Eventually, all JarEntries are packed into a jar file through a putNextEntry function in the JarOutputStream class. Accordingly, the bytecode of the OSGi bundle is obtained, and the algorithm described above is expressed as a getBundleFile function G3 (as shown in FIG. 4). FIG. 4 illustrates the pseudo code of the getBundleFile function.

In step S150, the second delivery context processing module 136 is provided to the second host 130. In step S160, the bytecode and the instance of the OSGi bundle are transmitted from the first host 120 to the second host 130 through the first delivery context processing module 126 and the second delivery context processing module 136. Herein the mobilize function G1 calls the send function in the sender class 126a to transmit the bytecode and the instance of the OSGi bundle to the second host 130. First, the send function determines whether a network connection can be established to the second host 130. The send function starts to transmit data after the network connection to the second host 130 is successfully established. During the data transmission process, the send function first obtains and transmits the bytecode of the OSGi bundle and then obtains and transmits the instance of the OSGi bundle. After that, the send function terminates the connection between the first host 120 and the second host 130. Finally, the send function stops the execution of the OSGi bundle on the first host 120.

After the second host 130 receives the bytecode and the instance of the OSGi bundle, in step S170, the second host 130 installs the bytecode and the instance of the OSGi bundle and executes the OSGi bundle through the second delivery context processing module 136. It should be mentioned that the execution status of the OSGi bundle remains unchanged and uninterrupted when the OSGi bundle moves between the first host 120 and the second host 130. Besides, the OSGi bundle can use services of the second host 130 after it moves to the second host 130.

Figure 5:
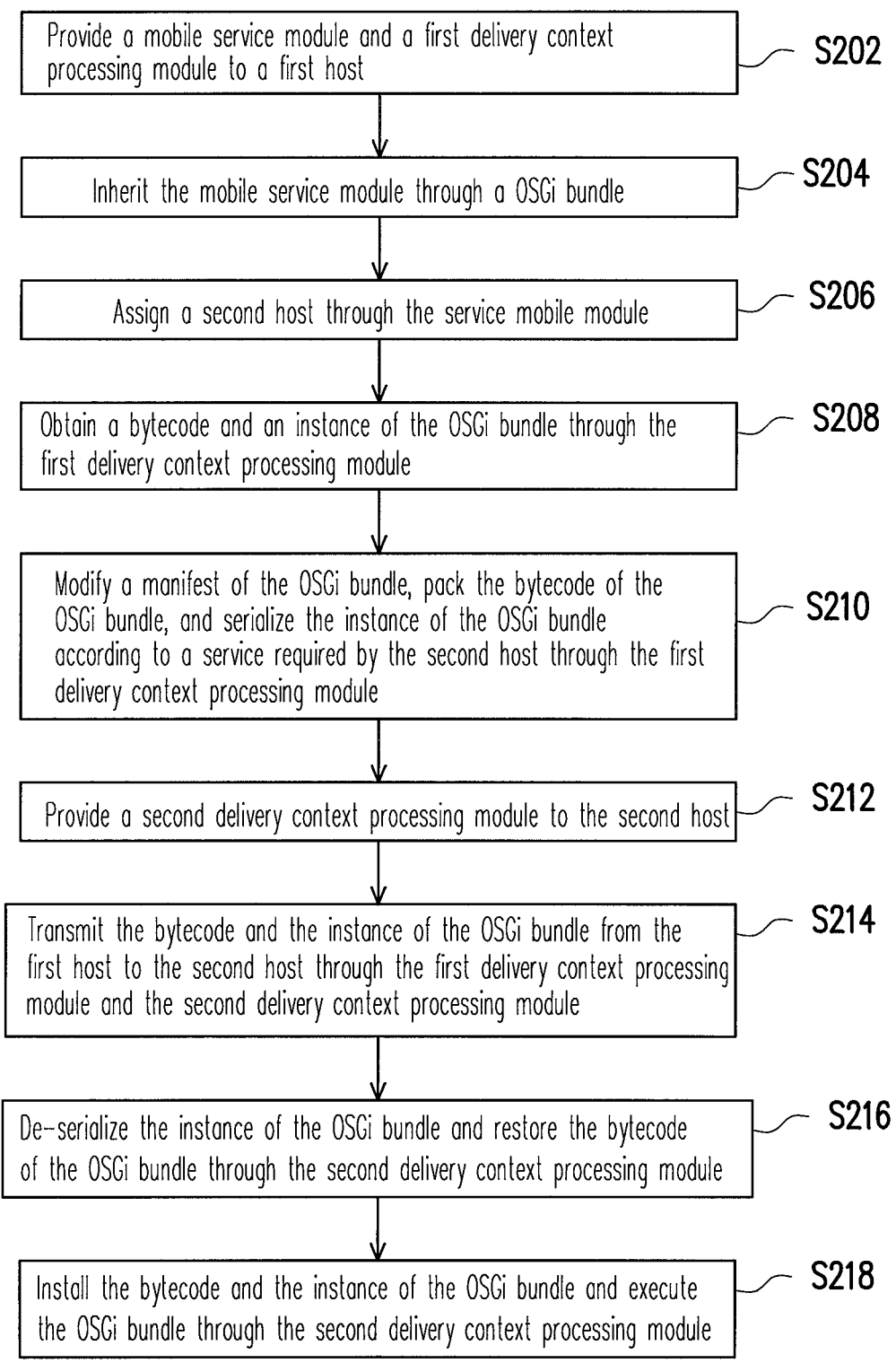
FIG. 5 is a flowchart of a service delivery method for OSGi-based framework according to another embodiment of the present invention.
Figure 6:
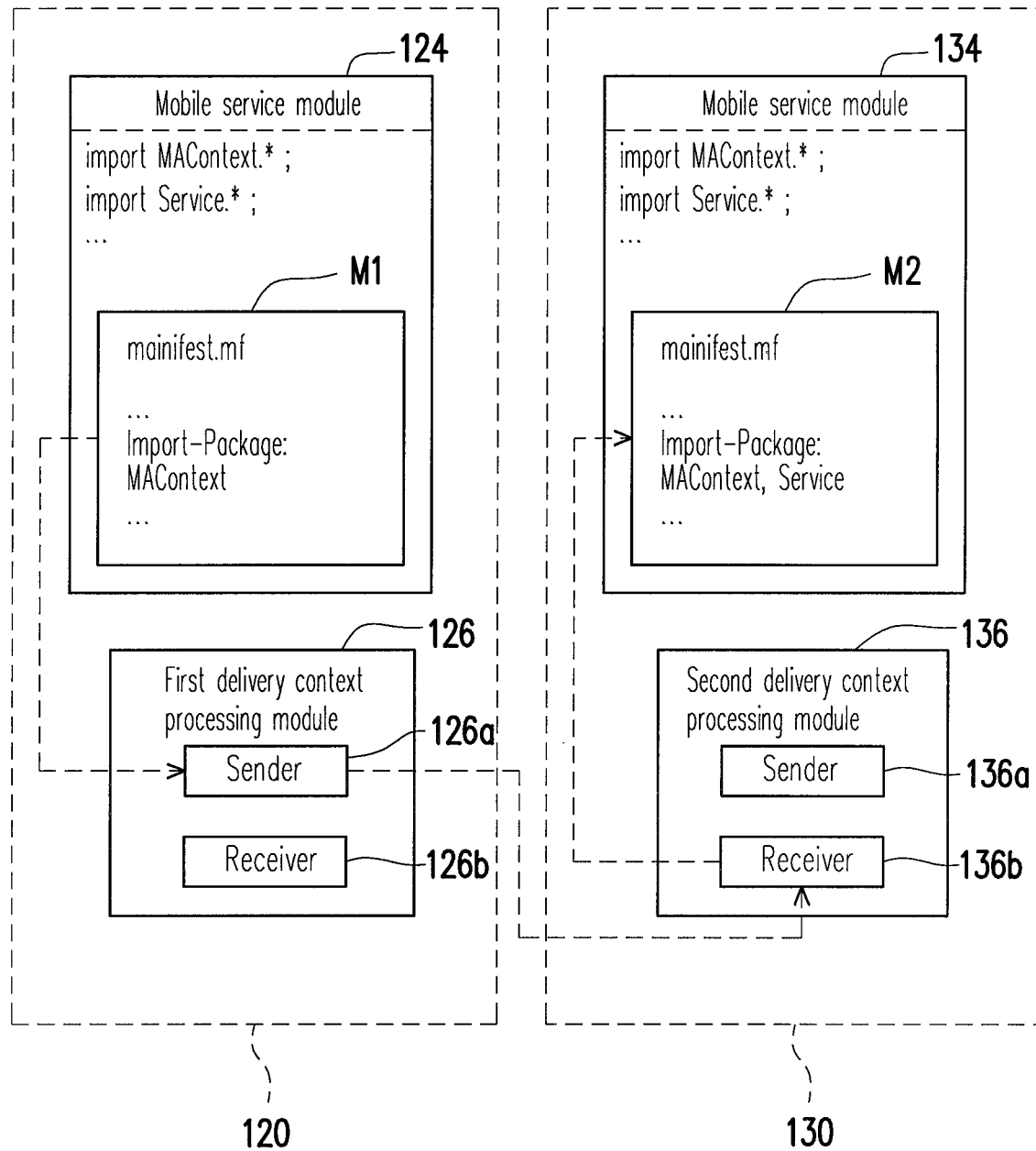
FIG. 6 is a diagram illustrating how the first host and a second host in FIG. 1 modify and transmit a manifest.

FIG. 5 is a flowchart of a service delivery method for OSGi-based framework according to another embodiment of the present invention, and FIG. 6 is a diagram illustrating how the first host and the second host in FIG. 1 transmit a manifest. Below, the service delivery method for OSGi-based framework in the present embodiment will be described with reference to the first host 120 and the second host 130 in FIG. 6. Besides, some steps in FIG. 5 are similar to those in FIG. 3 therefore will not be described herein.

Referring to FIG. 5, in step S202, a mobile service module 124 and a first delivery context processing module 126 are provided to the first host 120. Then, in step S204, the mobile service module 124 is inherited by the first host 120 through the OSGi bundle. Next, in step S206, the second host 130 is assigned through the mobile service module 124. After that, in step S208, the first host 120 obtains the bytecode and the instance of the OSGi bundle through the first delivery context processing module 126. Next, in step S210, a manifest M1 (manifest.mf) of the OSGi bundle is modified, the bytecode of the OSGi bundle is packed, and the instance of the OSGi bundle is serialized according to a service required by the second host 130 through the first delivery context processing module 126. Namely, in the present embodiment, the first delivery context processing module 126 further packs all the JarEntries into a jar file and records the execution status of the instance on the first host 120 by serializing the instance.

To be specific, because the subclass OSGiMobileService still needs to use services provided by the second host 130 after the OSGi bundle moves to the second host 130, the names of service packages to be used have to be imported in the bytecode of the subclass, the classpath used at compiling, and the manifest M1. The validity of the package imported in the bytecode is checked at the compiling time, and the validity of the package imported in the manifest M1 is checked at the execution time. Because the OSGi bundle is to be executed in two different environments, it is essential to import the service package in the bytecode, and the importion of the service package does not affect the execution of the OSGi bundle. However, because some services of the second host 130 are not to be provided on the first host 120, the checking performed by the OSGi platform to the OSGi bundle at the execution time can be avoided by modifying the manifest M1. Namely, no service package is imported on the first host 120 that does not provide any service, while the name of the service package is written into a manifest M2 on the second host 130 that provides the services. Namely, the package required by the second host 130 for providing the services is imported in the manifest M2 and denoted as "Service".

Thereafter, in step S212, a second delivery context processing module 136 is provided to the second host 130. After that, in step S214, the bytecode and the instance of the OSGi bundle are transmitted from the first host 120 to the second host 130 through the first delivery context processing module 126 and the second delivery context processing module 136. In the present embodiment, the receiver class 136b of the second delivery context processing module 136 is capable of receiving the bytecode and the instance of the OSGi bundle from the sender class 126a. After a receiving function in the receiver class 136b is executed, it waits for the sender host to establish the connection. After the connection is established, the receive function in the receiver class 136b starts to receive the bytecode and the instance of the OSGi bundle from the first host 120. After that, the receive function in the receiver class 136b terminates the connection.

Thereafter, in step S216, the instance of the OSGi bundle is de-serialized and the bytecode of the OSGi bundle is restored through the second delivery context processing module 136 (i.e., by calling the onMobilized function G2, as shown in FIG. 2B). Namely, the second delivery context processing module 136 receives the instance of the OSGi bundle from the sender class 126a through network transmission and stores it into an object instance, so as to de-serialize the instance of the OSGi bundle. Besides, the bytecode of the OSGi bundle is restored in the second host 130.

Thereafter, the second host 130 installs or updates the bytecode and executes the OSGi bundle through the second delivery context processing module 136 (step S218). Because the OSGi bundle inherits the mobile service module 124 when it is on the first host 120, the second delivery context processing module 136 can continue to use the functions of the OSGi bundle inherited from the mobile service module 124 after the bytecode of the OSGi bundle is installed in the second host 130. In other words, it is like the mobile service module 124 is transmitted to the second host 130 along with the OSGi bundle and becomes a mobile service module 134.

As described above, in the present invention, the bytecode and instance of an OSGi bundle are transmitted from a first host to a second host through a mobile service module and delivery context processing modules. Thus, the instance state generated at execution time is allowed to move between different hosts along with the bytecode through network transmission. Accordingly, maintaining a good network environment and transmitting data of a large quantity through a stable network connection become not necessary. Instead, the request to a specific service is brought to the host providing the service, and after receiving the desired service, the result is brought back to the original host that issues the request through an OSGi service bundle. Thereby, a continuous web service can be provided to different devices in a mobile communication environment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A service delivery method for OSGi-based (open service gateway initiative) framework, adaptable to a first host device executing an OSGi bundle, the service delivery method comprising:
   providing a mobile service module and a first delivery context processing module in the first host device;
   inheriting the mobile service module through the OSGi bundle;
   obtaining a bytecode and an instance of the OSGi bundle through the first delivery context processing module;
   providing a second delivery context processing module to a second host device;
   transmitting the bytecode and the instance of the OSGi bundle from the first host device to the second host device through the first delivery context processing module and the second delivery context processing module; and
   installing the bytecode and the instance of the OSGi bundle and executing the OSGi bundle and the functions inherited from the mobile service module through the second delivery context processing module.

2. The service delivery method according to claim 1, wherein after obtaining the bytecode and the instance of the OSGi bundle, the service delivery method further comprises:
   modifying a manifest of the OSGi bundle, packing the bytecode of the OSGi bundle, and serializing the instance of the OSGi bundle according to a service required by the second host device through the first delivery context processing module.

3. The service delivery method according to claim 1, wherein after transmitting the bytecode and the instance of the OSGi bundle to the second host device, the service delivery method further comprises:
   de-serializing the instance of the OSGi bundle and restoring the bytecode of the OSGi bundle through the second delivery context processing module.

4. A service system of an OSGi framework, comprising:
   a first host device, comprising:
      a mobile service module, inherited by an OSGi bundle, for assigning a second host device; and
      a first delivery context processing module, for obtaining a bytecode and an instance of the OSGi bundle and transmitting the bytecode and the instance of the OSGi bundle to the second host device; and
   the second host device, coupled to the first host device, the second host device comprising:
      a second delivery context processing module, for receiving and installing the bytecode and the instance of the OSGi bundle and executing the OSGi bundle and the functions inherited from the mobile service module.

5. The service system according to claim 4, wherein the first delivery context processing module further modifies a manifest of the OSGi bundle, packs the bytecode of the OSGi bundle, and serializes the instance of the OSGi bundle according to a service to be provided by the second host device.

6. The service system according to claim 4, wherein the second delivery context processing module further de-serializes the instance of the OSGi bundle and restores the bytecode of the OSGi bundle.

7. The service system according to claim 4 further comprising:
   a server, coupled to the first host device, wherein the first host device downloads the OSGi bundle from the server.

* * * * *